United States Patent
Abbasfar

(10) Patent No.: US 12,081,376 B2
(45) Date of Patent: Sep. 3, 2024

(54) DC BALANCED TRANSITION ENCODING

(71) Applicant: Samsung Display Co., Ltd., Yongin-si (KR)

(72) Inventor: Aliazam Abbasfar, Santa Clara, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 169 days.

(21) Appl. No.: 17/831,354

(22) Filed: Jun. 2, 2022

(65) Prior Publication Data

US 2023/0146120 A1 May 11, 2023

Related U.S. Application Data

(60) Provisional application No. 63/276,178, filed on Nov. 5, 2021.

(51) Int. Cl.
*H04L 25/493* (2006.01)
*H04L 9/06* (2006.01)
*H04L 25/45* (2006.01)

(52) U.S. Cl.
CPC ............ *H04L 25/493* (2013.01); *H04L 25/45* (2013.01); *H04L 9/0662* (2013.01)

(58) Field of Classification Search
CPC ............ H03M 7/14; H03M 7/20; H03M 7/30; H03M 7/3059; H03M 7/3073; H03M 7/3082
See application file for complete search history.

(56) References Cited

U.S. PATENT DOCUMENTS

| | | | |
|---|---|---|---|
| 5,162,791 A | | 11/1992 | Heegard |
| 5,229,769 A | * | 7/1993 | Gleichert ............ H03M 5/145 341/94 |
| 5,304,996 A | | 4/1994 | Hsu et al. |
| 5,671,236 A | | 9/1997 | Denissen et al. |
| 5,825,824 A | | 10/1998 | Lee et al. |
| 5,854,810 A | | 12/1998 | Denissen et al. |

(Continued)

FOREIGN PATENT DOCUMENTS

| | | |
|---|---|---|
| EP | 1 484 872 B1 | 7/2009 |
| EP | 2 892 156 A3 | 7/2015 |

(Continued)

OTHER PUBLICATIONS

Anonymous: "Paired disparity code," Wikipedia, Jun. 2021, 1 page, Retrieved from the Internet: URL:https://en.wikipedia.org/w/index.php?title=Paired_disparity_code&oldid=1027088253 [retrieved on Mar. 7, 2023].

(Continued)

*Primary Examiner* — Lam T Mai
(74) *Attorney, Agent, or Firm* — Lewis Roca Rothgerber Christie LLP

(57) ABSTRACT

A system and method for DC balanced transition encoding. In some embodiments, the method includes: generating a set of candidate encoding keys for a set of raw data words; selecting a first encoding key, of the set of candidate encoding keys, based on a first disparity contribution; and encoding the raw data words with the first encoding key, the first disparity contribution being a difference between the number of ones and the number of zeros in the result of encoding the set of raw data words with the first encoding key.

20 Claims, 6 Drawing Sheets

(56) References Cited

U.S. PATENT DOCUMENTS

| | | | |
|---|---|---|---|
| 5,999,571 A | 12/1999 | Shin et al. | |
| 6,747,580 B1* | 6/2004 | Schmidt | H03M 5/145 341/50 |
| 6,909,385 B2 | 6/2005 | Vasic et al. | |
| 6,920,604 B2 | 7/2005 | Coakeley et al. | |
| 6,970,522 B1 | 11/2005 | Morling et al. | |
| 7,064,683 B1* | 6/2006 | Westby | H03M 5/145 341/55 |
| 7,138,930 B1* | 11/2006 | Paul | H04L 25/14 341/59 |
| 7,791,507 B2 | 9/2010 | Coene et al. | |
| 8,078,935 B2 | 12/2011 | Cai et al. | |
| 8,155,215 B2* | 4/2012 | Ichiyama | H04L 25/493 713/400 |
| 8,275,080 B2 | 9/2012 | Jordan | |
| 8,402,354 B2 | 3/2013 | Ogiso | |
| 8,659,450 B1* | 2/2014 | Wu | H03M 7/20 341/59 |
| 8,891,520 B2 | 11/2014 | Alicherry et al. | |
| 9,097,755 B2 | 8/2015 | Dmitriev-Zdorov | |
| 9,515,675 B2* | 12/2016 | Bae | H04L 25/14 |
| 9,831,979 B2 | 11/2017 | Goulahsen | |
| 11,146,430 B1 | 10/2021 | Lee et al. | |
| 2006/0126751 A1 | 6/2006 | Bessios | |
| 2014/0119486 A1* | 5/2014 | Mendel | H04L 25/08 375/353 |
| 2014/0198837 A1* | 7/2014 | Fox | H04L 25/4906 375/240 |
| 2016/0072610 A1* | 3/2016 | Goulahsen | H04K 1/00 380/255 |
| 2018/0006668 A1* | 1/2018 | Wieland | H03M 7/20 |
| 2018/0006765 A1* | 1/2018 | Wieland | H04L 25/49 |
| 2020/0321079 A1 | 10/2020 | Huang et al. | |
| 2021/0142133 A1* | 5/2021 | Gaubatz | G06K 19/06037 |
| 2022/0397931 A1* | 12/2022 | Song | G06F 3/14 |
| 2023/0108230 A1* | 4/2023 | Abbasfar | G06F 9/30029 341/59 |

FOREIGN PATENT DOCUMENTS

| | | |
|---|---|---|
| JP | 62-29322 A | 2/1987 |
| JP | 2013-239940 A | 11/2013 |
| WO | WO 2020/203548 A1 | 10/2020 |
| WO | 2021/039098 A1 | 3/2021 |

OTHER PUBLICATIONS

Anonymous: "Constant-weight code," Wikipedia, Sep. 2021, 3 pages, Retrieved from the Internet: URL:https://en.wikipedia.org/w/index.php?title=Constant-weight_code&oldid=1045733408 [retrieved on Mar. 7, 2023].

EPO Extended European Search Report dated Mar. 21, 2023, issued in corresponding European Patent Application No. 22205488.4 (11 pages).

Zhang, Z. et al., "Multi-Bit-Flipping Decoding of Polar Codes Based on Medium-Level Bit-Channels Sets", 2019 IEEE Wireless Communications and Networking Conference, 6 pages, IEEE Xplore.

Japanese Office Action dated Jan. 9, 2024, issued in corresponding Japanese Patent Application No. 2022-175674, 5 pages.

\* cited by examiner

DC BALANCED TRANSITION ENCODING

CROSS-REFERENCE TO RELATED APPLICATION(S)

The present application claims priority to and the benefit of U.S. Provisional Application No. 63/276,178, filed Nov. 5, 2021, entitled "DC BALANCED TRANSITION ENCODING", the entire content of which is incorporated herein by reference.

FIELD

One or more aspects of embodiments according to the present disclosure relate to data transmission, and more particularly to a system and method for DC balanced transition encoding.

BACKGROUND

When serial data are transmitted from a transmitter to a receiver and the data include an embedded clock, transitions in the data may be employed for clock recovery in the receiver; as such, an absence of transitions during an extended interval of time may adversely impact the ability of the receiver to perform data recovery. Moreover, in AC-coupled data links it may be advantageous to limit the DC component of the serial data stream, to avoid unacceptable DC wander.

It is with respect to this general technical environment that aspects of the present disclosure are related.

SUMMARY

According to an embodiment of the present disclosure, there is provided a method, including: generating a set of candidate encoding keys for a set of raw data words; selecting a first encoding key, of the set of candidate encoding keys, based on a first disparity contribution; and encoding the raw data words with the first encoding key, the first disparity contribution being a difference between the number of ones and the number of zeros in the result of encoding the set of raw data words with the first encoding key.

In some embodiments, the selection of the first encoding key is further based on a running disparity of previously generated encoded data words.

In some embodiments: the absolute value of the sum of: the running disparity of previously generated encoded data words and the first disparity contribution is less than the absolute value of the sum of: the running disparity of previously generated encoded data words and a second disparity contribution; and the second disparity contribution is a difference between the number of ones and the number of zeros in the result of encoding the set of raw data words with a second encoding key of the set of candidate encoding keys.

In some embodiments, the method includes calculating the first disparity contribution, wherein the calculating of the first disparity contribution includes: calculating a set of bit level disparities, each corresponding to a bit level of the raw data words; changing the sign of each bit level disparity corresponding to a one in the first encoding key, to form a set of polarity-adjusted bit level disparities; and summing: the polarity-adjusted bit level disparities; and a disparity of the first encoding key, wherein: the absolute value of the bit level disparity at each bit level is equal to the absolute value of the difference between the number of ones, at the bit level, in all of the raw data words, and the number of zeros at the bit level, in all of the raw data words; and the absolute value of the disparity of the first encoding key is equal to the absolute value of the difference between the number of ones of the first encoding key and the number of zeros of the first encoding key.

In some embodiments, the calculating of a bit level disparity, of the set of bit level disparities, at a first bit level, includes calculating the difference between twice the number of ones at the first bit level and the number of raw data words.

In some embodiments, the result of encoding the set of raw data words with the first encoding key includes: the first encoding key; and the exclusive-OR of the first encoding key with each the raw data words.

In some embodiments, the result of encoding the set of raw data words with the first encoding key is a set of encoded data words having a maximum run length not exceeding a first threshold.

In some embodiments, the result of encoding the set of raw data words with the first encoding key includes: the first encoding key; and the exclusive-OR of the first encoding key with each the raw data words.

In some embodiments, the result of encoding the set of raw data words with any one of the set of candidate encoding keys is a set of encoded data words having a maximum run length not exceeding the first threshold.

In some embodiments, the absolute value of the first disparity contribution is less than the absolute value of a second disparity contribution; and the second disparity contribution is a difference between the number of ones and the number of zeros in the result of encoding the set of raw data words with a second encoding key of the set of candidate encoding keys.

According to an embodiment of the present disclosure, there is provided a system, including: a processing circuit; and a memory connected to the processing circuit, the memory storing instructions that, when executed by the processing circuit, cause the system to perform a method, the method including: generating a set of candidate encoding keys for a set of raw data words; selecting a first encoding key, of the set of candidate encoding keys, based on a running disparity of previously generated encoded data words; and encoding the raw data words with the first encoding key.

In some embodiments, the selection of the first encoding key is further based on a first disparity contribution, the first disparity contribution being a difference between the number of ones and the number of zeros in the result of encoding the set of raw data words with the first encoding key.

In some embodiments: the absolute value of the sum of: the running disparity of previously generated encoded data words and the first disparity contribution is less than the absolute value of the sum of: the running disparity of previously generated encoded data words and a second disparity contribution; and the second disparity contribution is a difference between the number of ones and the number of zeros in the result of encoding the set of raw data words with a second encoding key of the set of candidate encoding keys.

In some embodiments, the method includes calculating the first disparity contribution, wherein the calculating of the first disparity contribution includes: calculating a set of bit level disparities, each corresponding to a bit level of the raw data words; changing the sign of each bit level disparity corresponding to a one in the first encoding key, to form a set of polarity-adjusted bit level disparities; and summing: the polarity-adjusted bit level disparities; and a disparity of the first encoding key, wherein: the absolute value of the bit level disparity at each bit level is equal to the absolute value of the difference between the number of ones, at the bit level, in all of the raw data words, and the number of zeros at the bit level, in all of the raw data words; and the absolute value of the disparity of the first encoding key is equal to the absolute value of the difference between the number of ones of the first encoding key and the number of zeros of the first encoding key.

In some embodiments, the calculating of a bit level disparity, of the set of bit level disparities, at a first bit level, includes calculating the difference between twice the number of ones at the first bit level and the number of raw data words.

In some embodiments, the result of encoding the set of raw data words with the first encoding key includes: the first encoding key; and the exclusive-OR of the first encoding key with each the raw data words.

In some embodiments, the result of encoding the set of raw data words with the first encoding key is a set of encoded data words having a maximum run length less than a first threshold.

In some embodiments, the result of encoding the set of raw data words with the first encoding key includes: the first encoding key; and the exclusive-OR of the first encoding key with each the raw data words.

In some embodiments, the result of encoding the set of raw data words with any one of the set of candidate encoding keys is a set of encoded data words having a maximum run length less than the first threshold.

According to an embodiment of the present disclosure, there is provided a display, including: a timing controller; and a driver integrated circuit, the timing controller including a processing circuit; and a memory connected to the processing circuit, the memory storing instructions that, when executed by the processing circuit, cause the timing controller to perform a method, the method including: generating a set of candidate encoding keys for a set of raw data words; selecting a first encoding key, of the set of candidate encoding keys, based on a running disparity of previously generated encoded data words; and encoding the raw data words with the first encoding key.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a system and method for DC balanced transition encoding provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
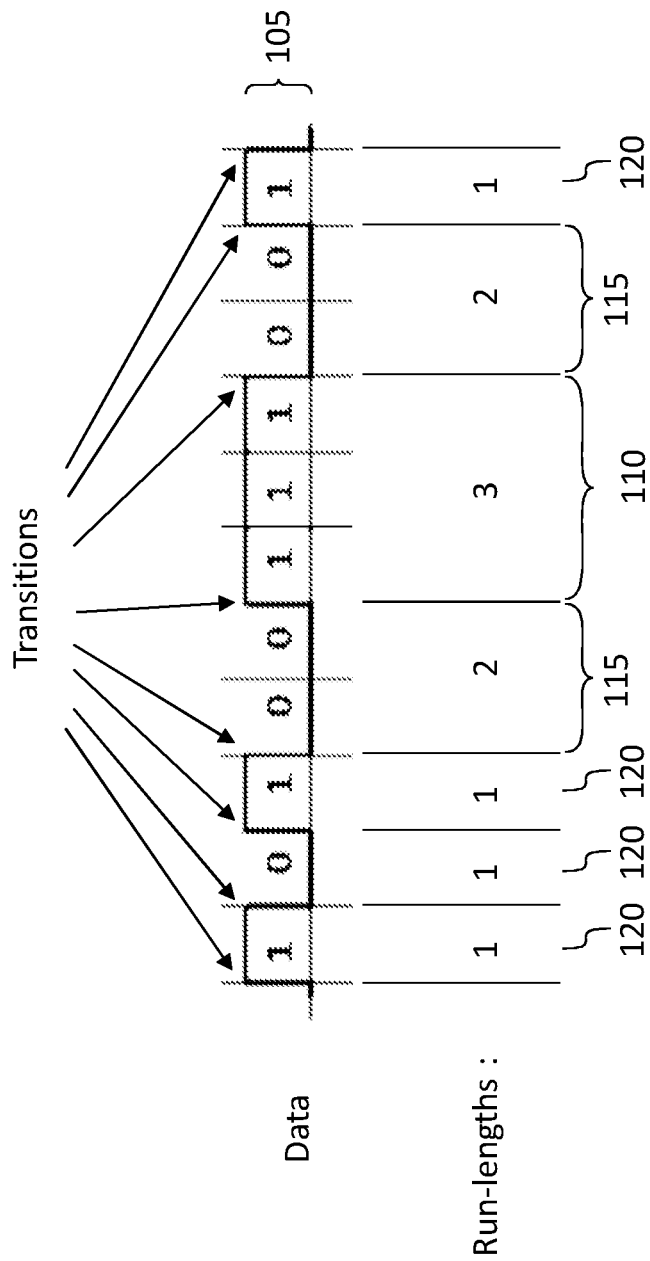
FIG. 1 is an illustration of a serial bit sequence, according to an embodiment of the present disclosure.

In operation, a serial transmitter may receive a plurality (e.g., a set or a sequence) of raw data words to be transmitted to a receiver, and the transmitter may process, e.g., encode, the raw data words and transmit the encoded data words to the receiver. Such encoding may be used, for example, to limit the run length of the transmitted data, where the "run length" is the length of an interval without transitions, i.e., the length of a run of consecutive zeros or ones. FIG. 1 shows an example of a portion of a transmitted data stream 105. In the portion illustrated, the longest run 110 has a length of three symbols, the two second-longest runs 115 each have a length of 2 symbols, and each of the remaining runs 120 has a length of one symbol.

The encoding performed by the transmitter may have the effect of ensuring (e.g., guaranteeing) that the longest run length does not exceed a certain threshold, and thereby to reduce the risk that a long run will compromise the ability of the receiver to perform clock recovery. The encoding method may, for example, involve encoding the raw data, one set (or "packet") of raw data words at a time, with an encoding key, and transmitting, to the receiver, the encoding key and the encoded data. The receiver may then use the received encoding key to decode the received encoded data, to recover the raw data. Such an encoding method may result in encoded data having a non-zero DC value, i.e., it may result in encoded data in which the number of zeros is consistently greater than, or consistently less than, the number of ones. If the link connecting the transmitter to the receiver is AC-coupled, this characteristic in the transmitted data may result in DC wander at the receiver.

As such, in some embodiments, the encoding is done in a manner that suppresses the DC component of the transmitted data. For example, the encoding may proceed as follows, for a packet of N p-bit raw data words (e.g., N six-bit raw data words, which may be denoted $\{x_1, x_2, \ldots, x_N\}$).

An encoding key K, having the same length (p) as each of the raw data words (e.g., 6 bits) and being different from (i) each of the raw data words and (ii) the complement of each of the raw data words, may then be selected. Because there are $2^p$ (e.g., 64, for p=6) possible p-bit words, selecting N to be less than $2^{(p-1)}$ (e.g., 31) will ensure that at least two such encoding keys K exist; for any such encoding key K the complement is also a viable (or "valid") encoding key. The encoded packet may then be formed as (i) the exclusive OR of each of the raw data words with the selected encoding key, and (ii) the encoding key, which may, for example, be appended to the end of the packet (or inserted at the beginning of the packet, or at any other position in the encoded packet at which the receiver expects to find the encoding key). For example, the result of encoding the set of raw data words may be $\{K, x_1\string^K, x_2\string^K, \ldots, x_{31}\string^K\}$ where the caret ("$\string^$") denotes the bit-wise exclusive-OR of two words. Such an encoded packet may have the characteristic that the maximum run length does not exceed a threshold, where the threshold is equal to $2(p-1)$.

To suppress the DC component of data encoded in this manner, the encoding key may be selected so as to minimize the absolute value of a running disparity of the encoded data (where the running disparity may be the difference between the total number of ones transmitted and the total number of zeros transmitted). For example, if, for the $n^{th}$ packet, the set of m (viable) candidate encoding keys is $\{K_1, K_2, \ldots, K_m\}$, the result of encoding the set of raw data words with each of the encoding keys may be calculated, and, for each of the candidate encoding keys, the effect that selecting the key would have on the running disparity of the transmitted data may be calculated, and the key that results in the running disparity having the smallest absolute value may be used.

For example, for each possible encoded packet (each encoded packet being the result of encoding the set of raw data words with a respective one of the candidate encoding keys), the sum of all the ones in the encoded packet minus the sum of all zeros in the packet may be calculated; this sum may be referred to as disparity contribution $D(K_i)$ for the $i^{th}$ candidate encoding key.

The running disparity (RD) over all previously transmitted packets, e.g., packets 0 to n−1, may be equal to the number of ones transmitted in packets 0 to n−1 minus the number of zeros transmitted in packets 0 to n−1. The quantity BEST_RD=minimum abs(RD(n−1)+D($K_i$)) over all candidate keys $K_i$, (which is the minimum running disparity achievable after transmission of the $n^{th}$ packet), where each Ki is one of the candidate encoding keys $\{K_1, K_2, \ldots, K_m\}$, may be found and the candidate key corresponding to this quantity, called K*, may then be used to encode the raw data, to generate the $n^{th}$ encoded packet. The running disparity may then be updated, by setting RD(n)=RD(n−1)+D(K*), for use in selecting an encoding key for the next (i.e., the n+1$^{th}$) packet.

In some embodiments, the absolute value of the disparity contribution $D(K_i)$ may be minimized. The disparity contribution having the minimum achievable absolute value at the $n^{th}$ packet may be found and the candidate key corresponding to this quantity may then be used to encode the raw data, to generate the $n^{th}$ encoded packet.

In some embodiments, the disparity contribution $D(K_i)$ may be calculated as follows. First, the number of ones in each bit-level may be counted in all of the raw data words; this number, at the $j^{th}$ bit level, may be referred to as sum1s[j].

For example, for six-bit words, six sums may be computed, for bit levels 0, 1, ..., and 5, i.e., sum1s[0], sum1s[1], ..., sum1s[5], each being a count of the number of ones in the raw data words at the corresponding bit level (e.g., sum1s[0] is the number of raw data words having a least significant bit (the bit at bit level 0) equal to one). A set of bit level disparities diff10[j], each corresponding to a bit level of the raw data words, may then be calculated as, for example:

diff10[j]=sum1s[j]−(31−sum1s[j])=2×sum1s[j]−31

The sign of each bit level disparity corresponding to a one in the encoding key $K_i$ may then be changed to form a set of polarity-adjusted bit level disparities (which, at the $j^{th}$ bit level, may be referred to as diff10[j]). Finally, the disparity contribution $D(K_i)$ may be calculated by summing the polarity-adjusted bit level disparities and a disparity of the encoding key:

$D_0(K_i)$=pdiff10[0]+pdiff10[1]+ . . . +pdiff10[5]+ diff10_key($K_i$)

where diff10_key($K_i$) is the difference between the number of ones and the number of zeros in the encoding key, $K_i$.

Figure 2A:
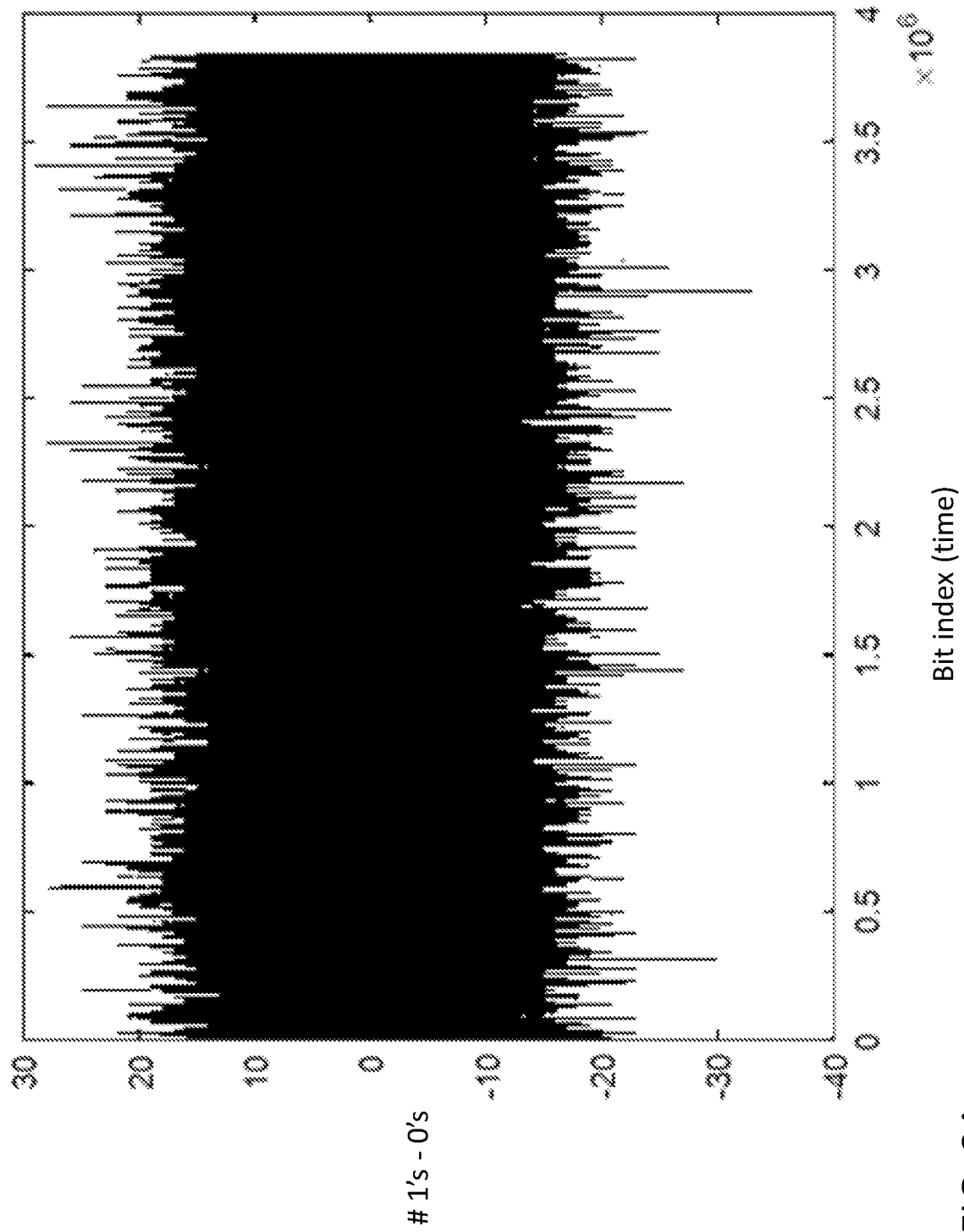
FIG. 2A is a graph of a simulation result, according to an embodiment of the present disclosure.
Figure 2B:
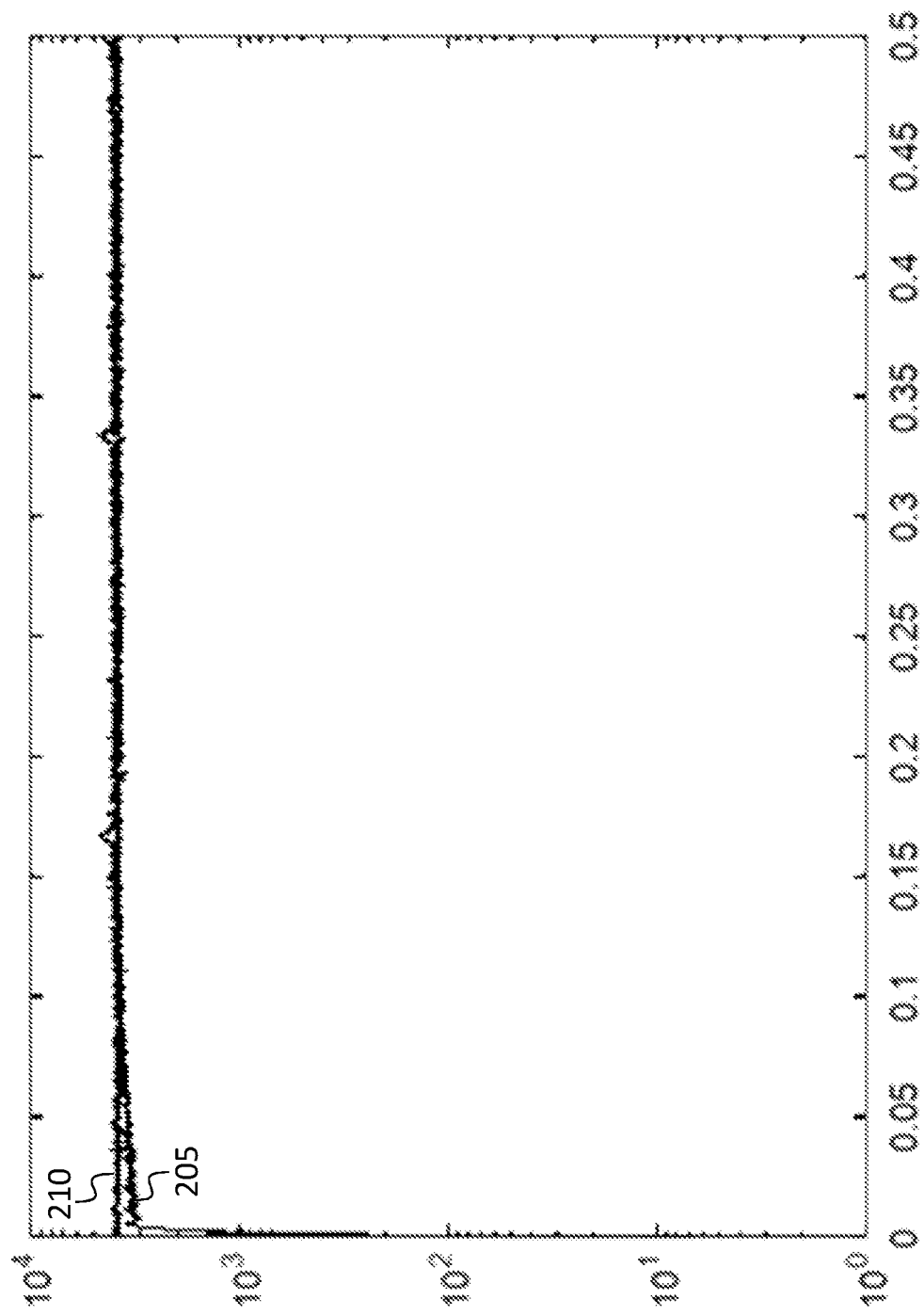
FIG. 2B is a graph of a simulation result, according to an embodiment of the present disclosure.
Figure 2C:
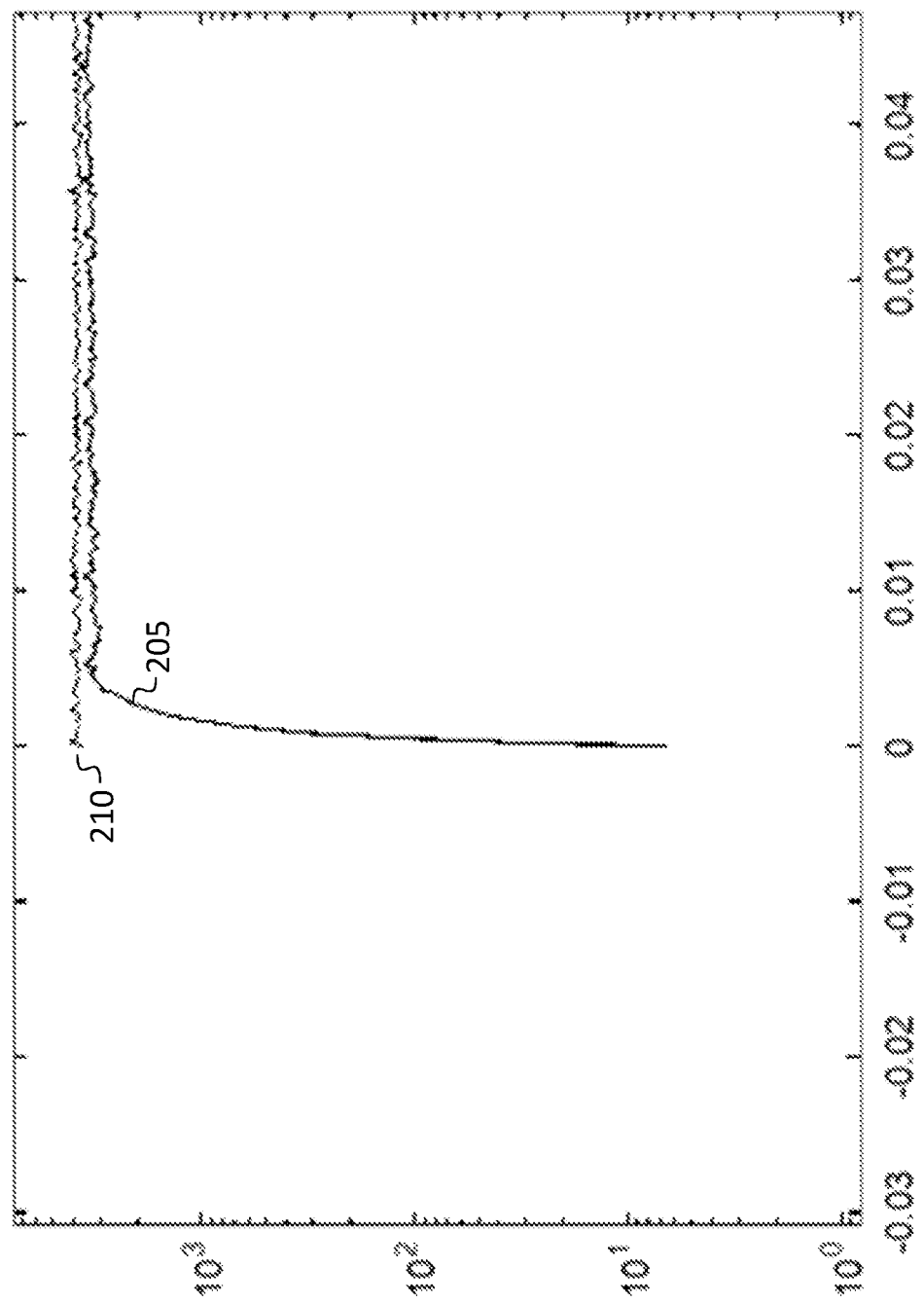
FIG. 2C is a graph of a simulation result, according to an embodiment of the present disclosure.

FIGS. 2A-2C show results from a simulation, in which an embodiment of the present disclosure was employed to perform DC balancing. The simulated raw data are sets of raw data words, each set including 31 six-bit pseudorandom raw data words. FIG. 2A shows the running disparity of the result of encoding the raw data, in accordance with some embodiments. It may be seen that, during the time interval simulated, the absolute value of the running disparity remains less than 30.

FIGS. 2B and 2C depict the power spectrum 205 of the transmitted data, plotted along with the power spectrum of a random bit stream 210 for reference (with FIG. 2C depicting an enlarged view of a low-frequency portion of the power spectra of FIG. 2B). It may be seen that at low frequencies the power spectrum is significantly reduced when DC balancing is performed.

A number of variants of the methods described above may be employed to have a similar or identical effect. For example, in the examples described above, a disparity in a set of bits is defined as the difference between the number of ones and the number of zeros in the set; the disparity may equally we be defined as the difference between the number of zeros and the number of ones in the set. As another example, each bit-level disparity may be calculated as diff10[j]=31−2×sum0s[j], where sum0s[j] is a count of the number of zeros in the raw data words at the $j^{th}$ bit level. As another example, instead of encoding each raw data word as the exclusive-OR of the raw data word with the encoding key, each raw data word may be encoded with the complement of the encoding key. As another example, if there are more than two candidate encoding keys (e.g., if there are four candidate encoding keys), then the method may use the second-best encoding key (i.e., the encoding key which, when used to encode the raw data words, results in the second-lowest value of the absolute value of the running disparity), instead of the best encoding key.

In some embodiments, the encoding key may be selected based on multiple criteria, including a criterion for performing DC balancing. For example, a threshold (maximum permissible) disparity may be set, and for each packet, an encoding key may be selected that prevents the absolute value of the running disparity from exceeding the threshold, and that, within this constraint, minimizes the run length in the transmitted data. As another example, an encoding key may be selected that minimizes a weighted sum of (i) the run length and (ii) the absolute value of the running disparity.

In some embodiments, DC balancing may be performed in an analogous manner (e.g., by selecting an encoding key, from among a set of candidate encoding keys, that minimizes the absolute value of the running disparity), with an encoding key selected by a different method or using a different encoding method.

Figure 3:
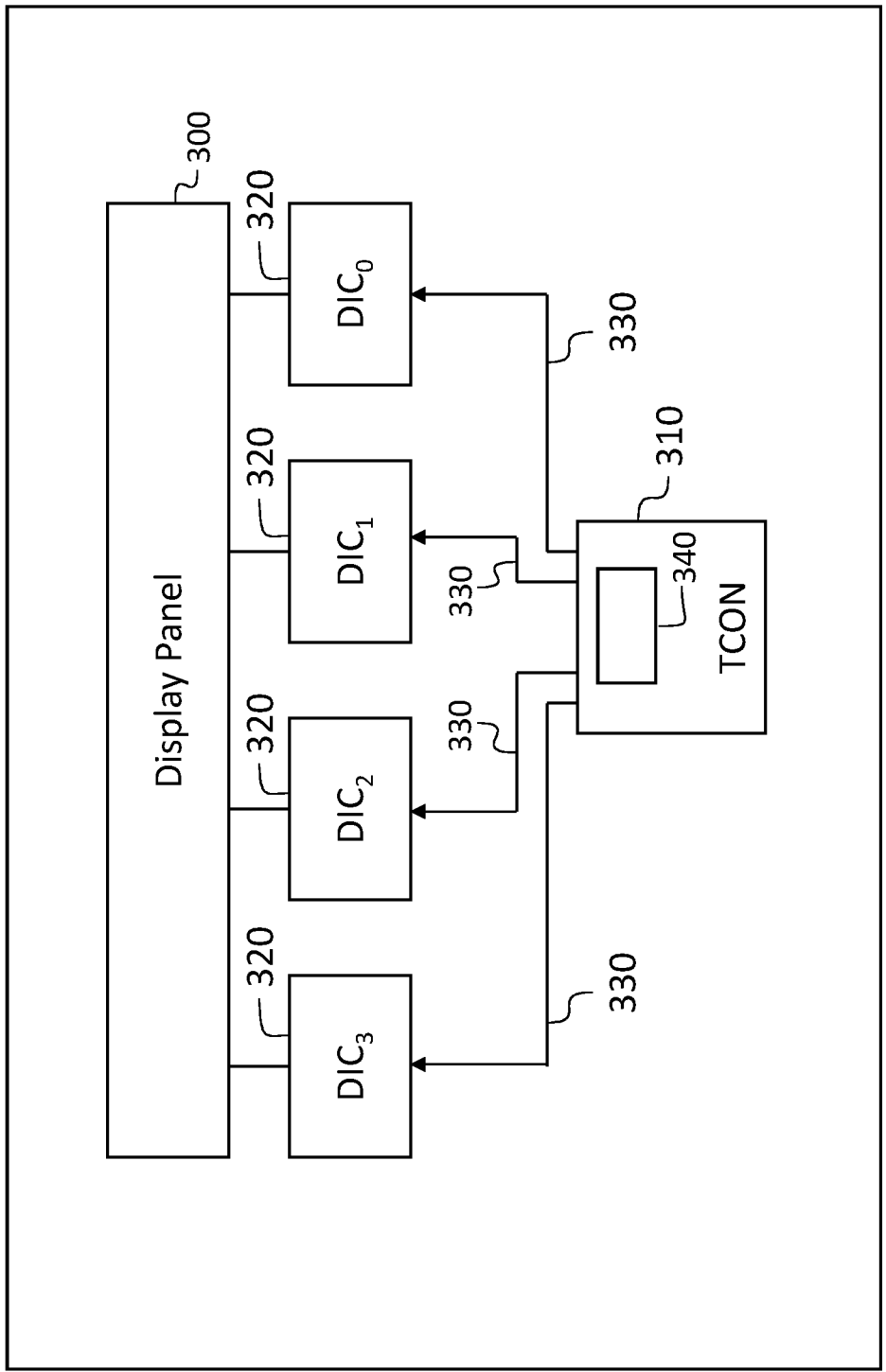
FIG. 3 is a block diagram of a display, according to an embodiment of the present disclosure.

FIG. 3 depicts a display, in accordance with some embodiments. For example, the display may be a video display such as a computer monitor or any other such related display. The display includes a display panel (e.g., an organic light-emitting diode (OLED) display panel) driven by a plurality of driver integrated circuits (ICs) 320. The driver ICs may generate analog drive signals, for driving the pixels of the display, in response to digital data received from a timing controller (TCON) 310, which may send the serial data, encoded according to a method disclosed herein, to the driver ICs over serial data links 330. The TCON 310 may include a processing circuit 340 configured to implement one or more of the methods disclosed herein.

Figure 4:
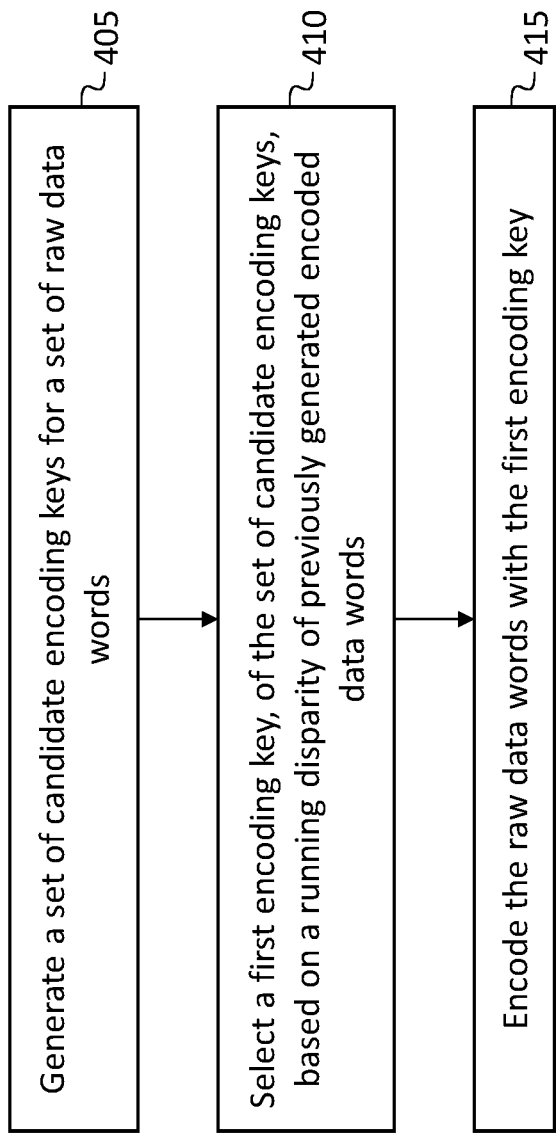
FIG. 4 is a flow chart of a method, according to an embodiment of the present disclosure.

FIG. 4 is a flow chart of a method. In some embodiments, the method includes generating, at 405, a set of candidate encoding keys for a set of raw data words; selecting, at 410, a first encoding key, of the set of candidate encoding keys, based on a running disparity of previously generated encoded data words; and encoding, at 415, the raw data words with the first encoding key.

As used herein, for two quantities A and B, "the difference" between A and B is A-B, and "a difference" between A and B is either A-B or B-A. As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for DC balanced transition encoding have been specifically described and illustrated herein, many modifications and variations will be apparent to those skilled in the art. Accordingly, it is to be understood that a system and method for DC balanced transition encoding constructed according to principles of this disclosure may be embodied other than as specifically described herein. The invention is also defined in the following claims, and equivalents thereof.

What is claimed is:

1. A method, comprising:
   generating a set of candidate encoding keys for a set of raw data words;
   selecting a first encoding key, of the set of candidate encoding keys, based on a first disparity contribution; and
   encoding the raw data words with the first encoding key to form a result comprising a number of ones and a number of zeros,
   wherein the first disparity contribution is a difference between the number of ones and the number of zeros in the result of encoding the set of raw data words with the first encoding key.

2. The method of claim 1, wherein the selecting of the first encoding key is further based on a running disparity of previously generated encoded data words.

3. The method of claim 2, wherein:
an absolute value of a sum of:
the running disparity of previously generated encoded data words and
the first disparity contribution
is less than the absolute value of the sum of:
the running disparity of previously generated encoded data words and
a second disparity contribution; and
the second disparity contribution is a difference between the number of ones and the number of zeros in the result of encoding the set of raw data words with a second encoding key of the set of candidate encoding keys.

4. The method of claim 2, further comprising calculating the first disparity contribution, wherein the calculating of the first disparity contribution comprises:
calculating a set of bit level disparities, each corresponding to a bit level of the raw data words;
changing a sign of each bit level disparity corresponding to a one in the first encoding key, to form a set of polarity-adjusted bit level disparities; and
summing:
the polarity-adjusted bit level disparities; and
a disparity of the first encoding key,
wherein:
an absolute value of the bit level disparity at each bit level is equal to the absolute value of the difference between
the number of ones, at the bit level, in all of the raw data words, and
the number of zeros at the bit level, in all of the raw data words; and
the absolute value of the disparity of the first encoding key is equal to the absolute value of the difference between the number of ones of the first encoding key and the number of zeros of the first encoding key.

5. The method of claim 4, wherein the calculating of a bit level disparity, of the set of bit level disparities, at a first bit level, comprises calculating the difference between
twice the number of ones at the first bit level and
the number of raw data words.

6. The method of claim 1, wherein the result of encoding the set of raw data words with the first encoding key comprises:
the first encoding key; and
an exclusive-OR of the first encoding key with each the raw data words.

7. The method of claim 1, wherein the result of encoding the set of raw data words with the first encoding key is a set of encoded data words having a maximum run length not exceeding a first threshold.

8. The method of claim 7, wherein the result of encoding the set of raw data words with the first encoding key comprises:
the first encoding key; and
an exclusive-OR of the first encoding key with each the raw data words.

9. The method of claim 7, wherein the result of encoding the set of raw data words with any one of the set of candidate encoding keys is a set of encoded data words having a maximum run length not exceeding the first threshold.

10. The method of claim 1, wherein an absolute value of the first disparity contribution is less than an absolute value of a second disparity contribution; and
the second disparity contribution is a difference between the number of ones and the number of zeros in the result of encoding the set of raw data words with a second encoding key of the set of candidate encoding keys.

11. A system, comprising:
a processing circuit; and
a memory connected to the processing circuit,
the memory storing instructions that, when executed by the processing circuit, cause the system to perform a method, the method comprising:
generating a set of candidate encoding keys for a set of raw data words;
selecting a first encoding key, of the set of candidate encoding keys, based on a running disparity of previously generated encoded data words; and
encoding the raw data words with the first encoding key to form a result comprising a number of ones and a number of zeros.

12. The system of claim 11, wherein the selection of the first encoding key is further based on a first disparity contribution, the first disparity contribution being a difference between the number of ones and the number of zeros in the result of encoding the set of raw data words with the first encoding key.

13. The system of claim 12, wherein:
an absolute value of a sum of:
the running disparity of previously generated encoded data words and
the first disparity contribution
is less than the absolute value of the sum of:
the running disparity of previously generated encoded data words and
a second disparity contribution; and
the second disparity contribution is a difference between the number of ones and the number of zeros in the result of encoding the set of raw data words with a second encoding key of the set of candidate encoding keys.

14. The system of claim 12, wherein the method comprises calculating the first disparity contribution, wherein the calculating of the first disparity contribution comprises:
calculating a set of bit level disparities, each corresponding to a bit level of the raw data words;
changing the sign of each bit level disparity corresponding to a one in the first encoding key, to form a set of polarity-adjusted bit level disparities; and
summing:
the polarity-adjusted bit level disparities; and
a disparity of the first encoding key,
wherein:
the absolute value of the bit level disparity at each bit level is equal to the absolute value of the difference between
the number of ones, at the bit level, in all of the raw data words, and
the number of zeros at the bit level, in all of the raw data words; and
the absolute value of the disparity of the first encoding key is equal to the absolute value of the difference between the number of ones of the first encoding key and the number of zeros of the first encoding key.

15. The system of claim 14, wherein the calculating of a bit level disparity, of the set of bit level disparities, at a first bit level, comprises calculating the difference between twice the number of ones at the first bit level and the number of raw data words.

16. The system of claim 11, wherein the result of encoding the set of raw data words with the first encoding key comprises:
the first encoding key; and
an exclusive-OR of the first encoding key with each the raw data words.

17. The system of claim 11, wherein the result of encoding the set of raw data words with the first encoding key is a set of encoded data words having a maximum run length less than a first threshold.

18. The system of claim 17, wherein the result of encoding the set of raw data words with the first encoding key comprises:
the first encoding key; and
an exclusive-OR of the first encoding key with each the raw data words.

19. The system of claim 17, wherein the result of encoding the set of raw data words with any one of the set of candidate encoding keys is a set of encoded data words having a maximum run length less than the first threshold.

20. A display, comprising:
a timing controller; and
a driver integrated circuit,
the timing controller comprising
a processing circuit; and
a memory connected to the processing circuit,
the memory storing instructions that, when executed by the processing circuit, cause the timing controller to perform a method, the method comprising:
generating a set of candidate encoding keys for a set of raw data words;
selecting a first encoding key, of the set of candidate encoding keys, based on a running disparity of previously generated encoded data words; and
encoding the raw data words with the first encoding key.

* * * * *